United States Patent
Matsuo

(10) Patent No.: US 7,349,624 B2
(45) Date of Patent: Mar. 25, 2008

(54) DIGITAL BROADCAST RECEIVING AND RECORDING APPARATUS

(75) Inventor: Masahiro Matsuo, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 1044 days.

(21) Appl. No.: 10/629,502

(22) Filed: Jul. 29, 2003

(65) Prior Publication Data
US 2004/0047590 A1 Mar. 11, 2004

(30) Foreign Application Priority Data
Aug. 22, 2002 (JP) .................. P2002-241560

(51) Int. Cl.
*H04N 5/91* (2006.01)

(52) U.S. Cl. .................. 386/83; 386/125; 386/46

(58) Field of Classification Search .................. 386/46, 386/83, 109, 125; 725/34, 35, 38, 39; 705/14, 705/37
See application file for complete search history.

(56) References Cited

U.S. PATENT DOCUMENTS 5,774,170 A * 6/1998 Hite et al. .................. 725/34
6,253,025 B1 * 6/2001 Kitamura et al. ........... 386/125
6,324,519 B1 * 11/2001 Eldering ....................... 705/14
6,714,722 B1 * 3/2004 Tsukidate .................... 386/83

FOREIGN PATENT DOCUMENTS

| JP | 10-84536 | 3/1998 |
|---|---|---|
| JP | 10-243348 | 9/1998 |
| JP | 2001-169194 | 6/2001 |
| JP | 2002-176400 | 6/2002 |

OTHER PUBLICATIONS

Patent Abstracts of Japan Publication No.: 2001-169194, dated Jun. 22, 2001 (1 page).
Patent Abstracts of Japan Publication No.: 2002-176400, dated Jun. 21, 2002 (1 page).
Japanese Office Action for Japanese Application No. 2002-241560, Mailed on Jun. 22, 2007, with English translation thereof (5 pages).

* cited by examiner

*Primary Examiner*—John Miller
*Assistant Examiner*—Christopher Onuaku
(74) *Attorney, Agent, or Firm*—Osha Liang LLP

(57) ABSTRACT

A digital broadcast signal of a channel received in a tuner is converted into digital data by a digital demodulation section. Based on the digital data, a CPU detects the partial of the corresponding subchannel from the whole transport stream (TS) of the digital data and causes a system controller to extract digital data of the subchannel and record the digital data on a hard disk in a predetermined format.

5 Claims, 1 Drawing Sheet

DIGITAL BROADCAST RECEIVING AND RECORDING APPARATUS

BACKGROUND OF THE INVENTION

1. Field of the Invention

The present invention relates to a digital broadcast receiving and recording apparatus for receiving a multiplexed broadcast signal including a plurality of channels each having at least one subchannel, outputting to a display such as a television receiver, and recording video data and audio data generated based on the broadcast signal.

2. Description of the Related Art

At present, a very large number of channels of digital broadcasts are provided; for example, 100 channels or more of digital broadcasts called ATSC (Advanced Television Systems Committee) system are provided in North America. Among the channels, one physical channel (simply, channel) may be made up of a plurality of subchannels, and programs on a plurality of subchannels may be broadcast in the same time period in one channel.

Upon reception of the digital broadcast signal of the selected channel, a digital broadcast receiving and recording apparatus demodulates the digital broadcast signal to digital data and then decodes the digital data by a decoder, converts into an analog video signal and an analog audio signal, and outputs the analog video signal and the analog audio signal to an analog television receiver.

The digital broadcast receiving and recording apparatus includes recording means for recording the provided digital data on a magnetic record medium such as a hard disk, an optical disk, or the like and records the data following a record command of a user. To give the record command, the user can press a record button of a controller such as a remote controller, while any desired program is being broadcast or can program the apparatus to record any desired program by setting the channel number, the record start time, and the record end time based on a program guide, and when the preset start time is reached, recording of the program is started and when the preset end time is reached, recording of the program is ended.

However, if a large number of broadcast channels exist and one channel contains a plurality of subchannels as described above, the user might want to record only the necessary channel of the plurality of subchannels of his or her own will.

However, the digital broadcast receiving and recording apparatus in the related art records programs on all subchannels contained in the channel in one recording. Thus, programs on unnecessary subchannels are also recorded. When the record time becomes long, if programs on unnecessary subchannels are also recorded, the use capacity of the record medium becomes enormous and the record capacity is wasted.

Hitherto, various arts of digital broadcast receiving and recording apparatus have been designed including those disclosed in JP-A-2001-169194, JP-A-2002-176400, but a method of solving the problem as described above is not disclosed.

SUMMARY OF THE INVENTION

It is therefore an object of the invention to provide a digital broadcast receiving and recording apparatus for enabling a user to set any desired subchannels to record the programs thereon for the user to record programs on a plurality of subchannels contained in one channel in the same time period.

In order to achieve the above object of the invention, according to a first aspect of the invention, there is provided a digital broadcast receiving and recording apparatus including: a receive section adapted to receive a broadcast wave provided by multiplexing broadcast signals of a plurality of channels each containing at least one subchannel; a demodulate section adapted to demodulate the broadcast signal of a selected channel and to generate video data and audio data based on the broadcast signal; a record section adapted to record the video data and the audio data generated by the demodulate section; and a control section adapted to control the record section so as to record the video data and the audio data of one of the subchannels contained in the selected channel or to simultaneously record the video data and the audio data of two or more of the subchannels according to a setup description.

According to the first aspect of the invention, one subchannel or a plurality of subchannels broadcast in the same time period within the same channel are selected in response to the record description set by the user, and the programs on the subchannels are recorded on the record section simultaneously.

According to a second aspect of the invention, in addition to the first aspect of the invention, the control section controls the record section so as to record the video data and the audio data of the subchannel with the smallest subchannel number of the subchannels contained in the selected channel.

According to the second aspect of the invention, when one channel is selected and the program thereon is recorded, the program(s) only on the subchannel with the smallest subchannel number contained in the channel is (are) recorded.

According to a third aspect of the invention, in addition to the first aspect of the invention, the control section controls the record section so as to simultaneously record the video data and the audio data on a predetermined number of subchannels in the ascending order of the subchannel numbers of the subchannels contained in the selected channel.

According to the third aspect of the invention, when one channel is selected and the program thereon is recorded, the programs on the two subchannels in the ascending order of the subchannel numbers contained in the channel are automatically recorded.

According to a fourth aspect of the invention, in addition to the first aspect of the invention, when any of the subchannels for recording becomes unreceivable, the control section controls the record section so as to record the video data and the audio data of any other subchannel contained in the selected channel whose reception is continued.

According to the fourth aspect of the invention, when any of the subchannels preset for recording the programs thereon becomes unreceivable, the program only on any other subchannel preset for recording the program thereon is continuously recorded on the record section. When any of the subchannels preset for recording the programs thereon becomes unreceivable, the program on any other subchannel than the subchannels with the setup subchannel numbers is not newly recorded.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

A digital broadcast receiving and recording apparatus according to an embodiment of the invention will be discussed with reference to the accompanying drawings.

Figure 1:
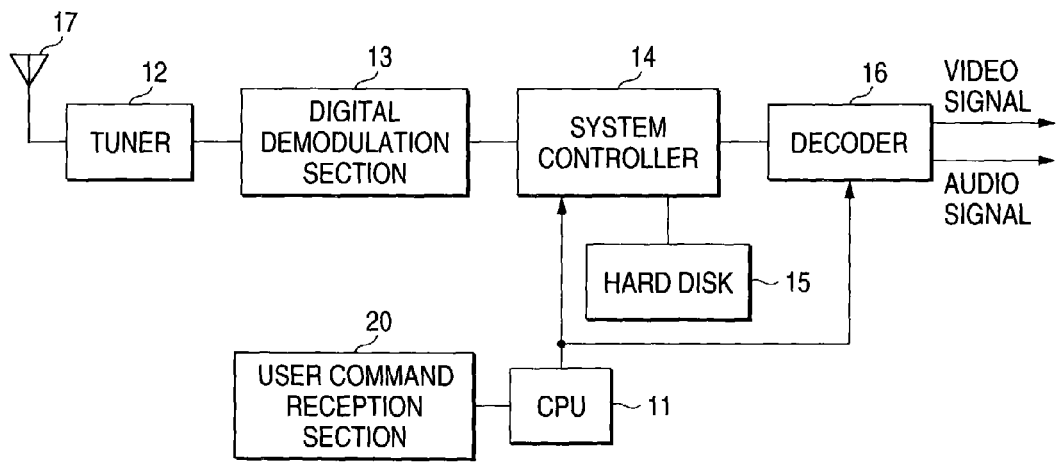
FIG. 1 is a block diagram to schematically show a configuration of a digital broadcast receiving and recording apparatus according to an embodiment of the invention.

FIG. 1 is a block diagram to schematically show a configuration of a digital broadcast receiving and recording apparatus according to the invention.

The digital broadcast receiving and recording apparatus includes main components of a tuner 12 (receive section), a digital demodulation section 13 (demodulate section), a system controller 14 and a hard disk 15 (storage medium) corresponding to storage section of the invention, a decoder 16, a user command reception section 20, and a CPU 11 corresponding to control section of the invention.

The tuner 12 is connected to an antenna 17 and extracts and amplifies the digital broadcast signal of the channel selected by a user from broadcast waves received at the antenna 17 and outputs a digital broadcast signal to the digital demodulation section 13, which then converts the digital broadcast signal of the selected channel into digital data and outputs the digital data through the system controller 14 to the decoder 16. The decoder 16 decodes the input digital data to generate an analog video signal and an analog audio signal and outputs the signals to an analog television receiver (not shown). The analog television receiver displays video on a screen based on the analog video signal and outputs audio from audio output means such as a loudspeaker based on the analog audio signal.

Figure 2:
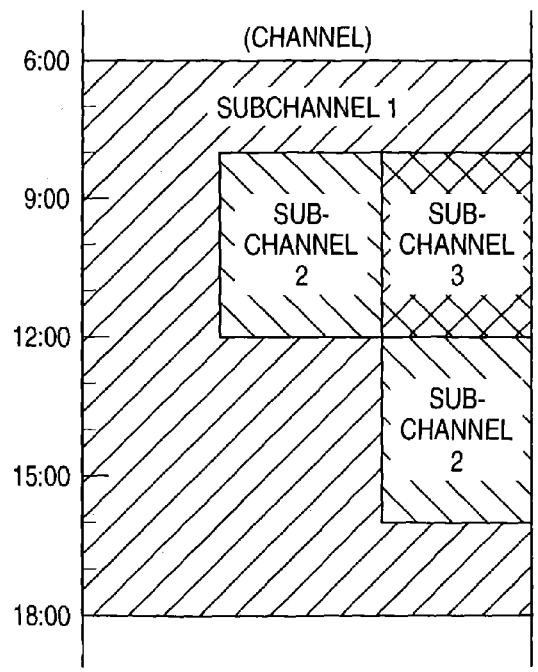
FIG. 2 is a schematic drawing to show a broadcast timetable of one channel.

The selected channel is made up of three subchannels as shown in FIG. 2. When one subchannel is selected, the CPU 11 acquires a transport stream (TS) of the whole channel containing the selected subchannel and detects a partial for identifying the selected subchannel. Based on the partial, the CPU 11 controls the system controller 14 to output only the selected subchannel to the decoder 16. Thus, the user views only the selected subchannel.

When the user uses a remote controller to select so as to record programs of only the subchannel with the smallest subchannel number, the CPU 11 detects the partial of the corresponding subchannel from the whole TS and causes the system controller 14 to extract digital data of the portion of the subchannel and record the digital data on the hard disk 15 in a predetermined format. The system controller 14 includes memory and when the digital data is stored in the memory over a predetermined time, the system controller 14 repeats the operation of converting the stored digital data into a file in a predetermined format and recording the file on the hard disk 15. at predetermined intervals. Accordingly, when programs on a plurality of subchannels are recorded at the same time, while the digital data of one channel is written onto the hard disk 15, the digital data of another subchannel can be stored, and the programs on the plurality of subchannels can be recorded on the hard disk 15 almost at the same time. Generally, an MPEG format is used as the file record format.

Hereinafter, a method for the user to record a program on any desired subchannel will be discussed.

When the user uses the remote controller to input a command for recording a program on the subchannel with the smallest subchannel number, the user command reception section 20 receives the command and outputs the command to the CPU 11.

In FIG. 2, the subchannel with the smallest subchannel number is subchannel 1 and therefore the CPU 11 always controls the apparatus so as to record programs only on subchannel 1 on the hard disk 15. For example, to record programs on subchannel 1 consecutively from 6:00 to 18:00, the channel includes only subchannel 1 between 6:00 and 8:00 and thus the digital data of the whole channel is recorded. Between 8:00 and 12:00, subchannels 1, 2, and 3 make up the channel and thus the digital data of only subchannel 1 is extracted and recorded from the whole TS. Between 12:00 and 16:00, subchannels 1 and 2 make up the channel and thus the digital data of only subchannel 1 is extracted and recorded from the whole TS. Since the channel includes only subchannel 1 between 16:00 and 18:00, the digital data of the whole channel is recorded.

Since the whole channel provides subchannel 1 between 6:00 and 8:00 and between 16:00 and 18:00, a wide band can be used and the digital data can be made high-definition data. Likewise, between 12:00 and 16:00, subchannels 1 and 2 make up the whole channel and subchannel 2 is broadcast in the band occupied by subchannel 3 between 8:00 and 12:00 and subchannel 1 is broadcast in the band occupied by subchannels 1 and 2 between 8:00 and 12:00. The channel is thus assigned, whereby subchannel 1 as the main can be broadcast with high-definition data as much as possible.

When the user uses the remote controller to select so as to record programs of two subchannels in the ascending order of the subchannel numbers, the CPU 11 detects the partials of the corresponding subchannels from the whole TS and causes the system controller 14 to extract digital data of the portions of the subchannels and record the digital data on the hard disk 15 in the predetermined format. In the time periods in which only one subchannel is included, when the broadcast subchannel satisfies the above-mentioned condition, the CPU 11 controls the system controller 14 so as to record the program only on the subchannel.

For example, in FIG. 2, the program only on subchannel 1 is recorded between 6:00 and 8:00. The partials of subchannels 1 and 2 are detected from the TS of the whole channel and the digital data only of subchannels 1 and 2 is recorded between 8:00 and 12:00. The channel being made up of only subchannels 1 and 2 is detected and the digital data of the whole channel is recorded between 12:00 and 16:00. The channel including only subchannel 1 is detected and the digital data of the whole channel is recorded between 16:00 and 18:00.

A method of playing back the digital data including the subchannel thus recorded is as follows.

When the user plays back the recorded digital data and selects any desired subchannel, the CPU 11 detects the partial of the corresponding subchannel contained in the digital data and controls the system controller 14 so as to extract only the digital data of the specified subchannel and outputs the digital data to the decoder 16. The digital data of the specified subchannel is decoded by the decoder 16 to generate a video signal and an audio signal, and the video signal and the audio signal are output to the television receiver.

In doing so, the user can record the program only on the specified subchannel as desired and recording programs on unnecessary subchannels can be circumvented, so that the record medium of the hard disk can be used efficiently.

For example, when subchannel 2 scheduled between 8:00 and 12:00 is not broadcast, the CPU 11 records the program only on subchannel 1 rather than programs on subchannels 1 and 3. When broadcast of subchannel 2 is restarted between 12:00 and 16:00, the CPU 11 records the programs on subchannels 1 and 2. That is, the CPU 11 detects two of the subchannels making up the channel in the ascending order of the subchannel numbers. If the subchannel does not exist and a subchannel with a large subchannel number next to the subchannel number of the setup subchannel exists at one point in the time period of preselected recording, the CPU 11 does not detect and does not record.

In doing so, the program on any other subchannel than the subchannels set by the user is not recorded, so that using the record medium of the hard disk more than necessary can be prevented and the record capacity can be used efficiently.

The reason why programs are recorded in the ascending order of the subchannel numbers as in the embodiment is that the smaller the subchannel number, the more often the corresponding subchannel assigned to the main of the channel. For example, often subchannel 1 is the main channel and subchannel 2 becomes the next main channel and often subchannels are formed in order starting at the smallest subchannel number. However, if the subchannel number of the main channel is not small, subchannels for arbitrary recording can also be set in response to the subchannel number.

The above-described record operation can be applied not only to the record operation performed by the user during broadcasting, but also to preselected program record operation.

In the description given above, the method of recording the programs on the two subchannels in the ascending order of the subchannel numbers is shown, but three or more subchannels can also be set for recording the programs on the three or more subchannels.

In the embodiment, the method of recording the digital data containing video data, audio data, and program information data as one file is shown, but the video data, the audio data, and the program information data may be separated and recorded as different files. In this case, information indicating the relationship to combine the files at the playback time may be added.

The digital broadcast receiving and recording apparatus of the embodiment can also record the programs on the whole channel as the apparatus is set so as to record the programs on all subchannels.

As described above with reference to the preferred embodiment, according to the invention, one subchannel or a plurality of subchannels broadcast in the same time period within the same channel are selected in response to the record description set by the user, and the programs on the subchannels are recorded simultaneously, so that the user can record the digital data of any desired subchannel only. Further, programs on subchannels unnecessary for the user are not recorded and thus the use capacity of the record medium can be prevented from becoming unnecessarily large and the record capacity can be used efficiently.

When one channel is selected and the program thereon is recorded, the program(s) only on the subchannel with the smallest subchannel number contained in the channel is (are) recorded or the programs on the two subchannels in the ascending order of the subchannel numbers contained in the channel are automatically recorded. Thus, the programs on the subchannels comparatively high in importance can be recorded preferentially.

When any of the subchannels preset for recording the programs thereon becomes unreceivable, the program only on any other subchannel is continuously recorded on the record section or when any of the subchannels preset for recording the programs thereon becomes unreceivable, the program on any other subchannel than the subchannels with the preset subchannel numbers is not newly recorded, so that the programs only on the subchannels desired by the user are recorded.

Although the present invention has been shown and described with reference to the specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A digital broadcast receiving and recording apparatus comprising:

a receive section adapted to receive a broadcast wave provided by multiplexing broadcast signals of a plurality of channels each containing at least one subchannel;

a demodulate section adapted to demodulate the broadcast signal of a selected channel and to generate video data and audio data based on the broadcast signal;

a record section adapted to record the video data and the audio data generated by the demodulate section; and a control section adapted to control the record section so as to record the video data and the audio data of one of the subchannels contained in the selected channel or to simultaneously record the video data and the audio data of two or more of the subchannels according to a setup description, wherein the control section controls the record section so as to record the video data and the audio data of the subchannel with the smallest subchannel number of the subchannels contained in the selected channel or to simultaneously record the video data and the audio data on a predetermined number of subchannels in the ascending order of the subchannel numbers of the subchannels contained in the selected channel, and wherein when any of the subchannels for recording becomes unreceivable, the control section controls the record section so as to record the video data and the audio data of any other subchannel contained in the selected channel whose reception is continued.

2. A digital broadcast receiving and recording apparatus comprising:

a receive section adapted to receive a broadcast wave provided by multiplexing broadcast signals of a plurality of channels each containing at least one subchannel;

a demodulate section adapted to demodulate the broadcast signal of a selected channel and to generate video data and audio data based on the broadcast signal;

a record section adapted to record the video data and the audio data generated by the demodulate section; and a control section adapted to control the record section so as to record the video data and the audio data of one of the subchannels contained in the selected channel or to simultaneously record the video data and the audio data of two or more of the subchannels according to a setup description;

wherein the control section controls the record section so as to record the video data and the audio data of the subchannel with the smallest subchannel number of the subchannels contained in the selected channel.

3. The digital broadcast receiving and recording apparatus as claimed in claim 2, wherein when any of the subchannels for recording becomes unreceivable, the control section controls the record section so as to record the video data and the audio data of any other subchannel contained in the selected channel whose reception is continued.

4. A digital broadcast receiving and recording apparatus comprising:

- a receive section adapted to receive a broadcast wave provided by multiplexing broadcast signals of a plurality of channels each containing at least one subchannel;
- a demodulate section adapted to demodulate the broadcast signal of a selected channel and to generate video data and audio data based on the broadcast signal;
- a record section adapted to record the video data and the audio data generated by the demodulate section; and a control section adapted to control the record section so as to record the video data and the audio data of one of the subchannels contained in the selected channel or to simultaneously record the video data and the audio data of two or more of the subchannels according to a setup description;
- wherein the control section controls the record section so as to simultaneously record the video data and the audio data on a predetermined number of subchannels in the ascending order of the subchannel numbers of the subchannels contained in the selected channel.

5. The digital broadcast receiving and recording apparatus as claimed in claim 4, wherein when any of the subchannels for recording becomes unreceivable, the control section controls the record section so as to record the video data and the audio data of any other subchannel contained in the selected channel whose reception is continued.

* * * * *